United States Patent [19]

Jakobsen et al.

[11] 4,259,621
[45] Mar. 31, 1981

[54] ARRANGEMENT FOR GUIDING THE ROTARY SPEED OF ONE OR MORE FOLLOWER MOTORS IN RESPONSE TO THE PULSE FREQUENCY OF A GUIDE PULSE FREQUENCY GENERATOR

[75] Inventors: Jakob S. Jakobsen, Sonderborg; Robert M. McCulloch, Broager, both of Denmark

[73] Assignee: Danfoss A/S, Nordborg, Denmark

[21] Appl. No.: 938,698

[22] Filed: Aug. 31, 1978

[30] Foreign Application Priority Data

Sep. 3, 1977 [DE] Fed. Rep. of Germany ....... 2739846

[51] Int. Cl.³ .............................................. H02P 5/46
[52] U.S. Cl. ........................................ 318/85; 318/67; 318/49; 318/113
[58] Field of Search ....................... 318/34, 41, 49, 50, 318/77, 78, 113, 312, 301, 311, 309, 66, 67, 85, 329

[56] References Cited

U.S. PATENT DOCUMENTS

| | | | |
|---|---|---|---|
| 3,064,173 | 11/1962 | Breen et al. | 318/77 X |
| 3,351,831 | 11/1967 | Hemphill et al. | 318/77 |
| 3,600,655 | 8/1971 | Karlin et al. | 318/78 X |
| 4,079,297 | 3/1978 | Norrell | 318/85 |

*Primary Examiner*—Ulysses Weldon
*Attorney, Agent, or Firm*—Wayne B. Easton

[57] ABSTRACT

A speed regulator for a guide and follower motor assembly. A guide pulse frequency generator driven by a guide motor drives a frequency converter which drives a follower motor. The frequency converter includes a frequency regulator with a negative feed back which includes a frequency divider. Adjusting and setting circuits for the frequency divider include an up/down counter for operating the frequency divider, a resetting operation of the counter to provide a frequency indicating value for its output, an adjustable pulse generator for driving the counter, an add/subtract circuit, and a comparator responsive to the add/subtract circuit and the counter to control the pulse generator.

5 Claims, 3 Drawing Figures

ARRANGEMENT FOR GUIDING THE ROTARY SPEED OF ONE OR MORE FOLLOWER MOTORS IN RESPONSE TO THE PULSE FREQUENCY OF A GUIDE PULSE FREQUENCY GENERATOR

The invention relates to an arrangement for guiding the rotary speed of one or more follower motors in response to the pulse frequency of a guide pulse frequency generator, particularly a guide pulse frequency generator of which the pulse frequency corresponds to the rotary speed of a guide motor, wherein a frequency converter adjustable by adjusting means is disposed between the guide pulse frequency generator and each follower motor.

In a known arrangement of this kind, the guide pulse frequency generator and the frequency converter are voltage-controlled oscillators to which the control voltage can be fed from a common potentiometer. In this way an accurate setting of the frequency or the rotary speed is not possible whereas, by reason of position regulating means which likewise control the frequency converter and are disposed behind the guide pulse frequency generator, the rotary speed of the follower motor in question can be set no higher than the frequency of the guide pulse frequency generator or the rotary speed of the guide motor.

The invention is based on the problem of providing an arrangement of the aforementioned kind permitting a more accurate setting of the rotary speed of a follower motor, particularly the setting of a higher speed than that corresponding to the frequency of the guide pulse frequency generator.

According to the invention, this problem is solved in that the frequency converter comprises a frequency regulator negatively fed back by way of a frequency divider with an adjustable divisor, and the adjusting side of the frequency divider can be acted on in response to the setting of the adjusting means.

In this arrangement, the frequency regulator ensures that its input quantity, the control departure, is practically zero so that its output frequency is directly proportional to its input frequency and the proportionality factor is the divisor of the frequency divider lying in the negative feedback of the frequency regulator. Since this divisor is a whole number, i.e. larger than 1, the output frequency of the frequency regulator is also larger than its input frequency. Apart from a higher power of resolution and the higher accuracy of adjustment necessitated thereby, any desired whole divisor can be very easily and accurately set in a predetermined range of numbers.

Preferably, a second frequency divider is connected behind the frequency regulator. In this way one can also set fractions and ratios larger or less than 1 between the output frequency and the input frequency of the frequency converter.

Next, one can ensure that the output side of a forwards-backwards counter is connected to the adjusting side of the first frequency divider and the one input side of a comparator, that the other input side of the comparator is connected to the adjusting means, that a parity output of the comparator is connected to a blocking input circuit of an astable sequence pulse generator of which the output is connected to the counting input of the forwards-backwards counter, and that the counting direction change-over input of the forwards-backwards counter can be acted on by a signal indicating the predominance of the one or other input quantity of the comparator. With this arrangement, the desired divisor at the first frequency divider is not set suddenly at the same time as setting this divisor in the adjusting means but only with a finite speed necessitated by the pulse frequency of the sequence pulse generator. This means that the transition from one set divisor to a newly set divisor is linear. This has the advantage that one substantially avoids rapid changes in the speed of the follower motor as a result of sudden changes in the desired value and one thereby avoids hunting.

If the sequence pulse frequency of the sequence pulse generator is adjustable, the change in the desired rotary speed of the follower motor can be adapted to the adjusting inertia of the follower motor.

Next, it is favourable if one ensures that the adjusting means associated with the first frequency divider comprise a digit selector switch with a sign selector element, that a desired number of a predetermined range of numbers and its sign can be set by means of this digit selector switch, and that the adjusting means comprise an adding-subtracting circuit of which the inputs are acted on by the output of the digit selector switch and at least one predetermined number. This construction permits the setting by means of the selector switch of a divisor for the first frequency divider or a follower motor speed that is higher or lower than the predetermined number. If the predetermined number is considerably higher than the predetermined range of number, the setting of a number of the predetermined range of numbers corresponds to the selection of a divisor for the first frequency divider or a follower motor speed which departs by a small and relatively accurately settable percentage from a fundamental setting that is the same for all follower motors. Further, if one ensures that the adding-subtracting circuit can have fed to it from a second digit selector switch a predetermined number, together with its sign, which is considerably less than the predetermined range of numbers, the divisor selected from the larger range of numbers or the rotary speed can, by actuating the digit selector switch associated with the smaller predetermined number, be momentarily increased or reduced by a correspondingly small amount, for example in order to achieve accurate tuning of the speeds of two motors up to the same rotary position.

Referred to the larger predetermined number, which may be a fixed set tenth power in the form of an augend, the setting of the lower predetermined number will then likewise correspond to a percentage alteration, but an as yet lower percentage alteration, relatively to the fundamental setting.

Further, the output circuit of the adjusting means may comprise a gate circuit whic acts on the other input side of the comparator and which is operable or blockable in response to the setting of a start-sop switch. In this way the output quantity of the adjusting means can be switched on or reduced by simple actuation of the start-stop switch without the desired rotary speed of the associated follower motor likewise changing suddenly because of the forwards-backwards counter which continues to be interposed.

Further, an output stage of the adjusting means associated with the lowest digit can be connected directly to the input side of a divisor stage of the first frequency divider that is associated with the lowest digit. In this way a simpler gate circuit will suffice on the one hand whilst on the other hand one ensures that the divisor of the first frequency divider does not become zero because the divisor of a frequency divider can normally not be less than 1. Nevertheless, with an adequately low output frequency of the frequency regulator, which is given by the lowest divisor stage, the follower motor can be stopped as is desired by blocking the gate circuit.

The latter is for example readily possible if the frequency converter comprises a third frequency divider disposed between the guide pulse frequency generator and the frequency regulator or if the divisor of the second frequency divider is selected to be appropriately high.

Preferably, the divider of the second frequency divider is likewise adjustable. This permits adaptation to the sensitivity of the downstream follower motor.

In addition, it is favourable if a speed regulator controlling the rotary speed of the follower motor is connected behind the frequency converter. This speed regulator ensures that the rotary speed of the follower motor precisely follows the desired speed set by means of the frequency converter.

A preferred example of the invention will now be described in more detail with reference to the drawing, wherein.

Figure 1:
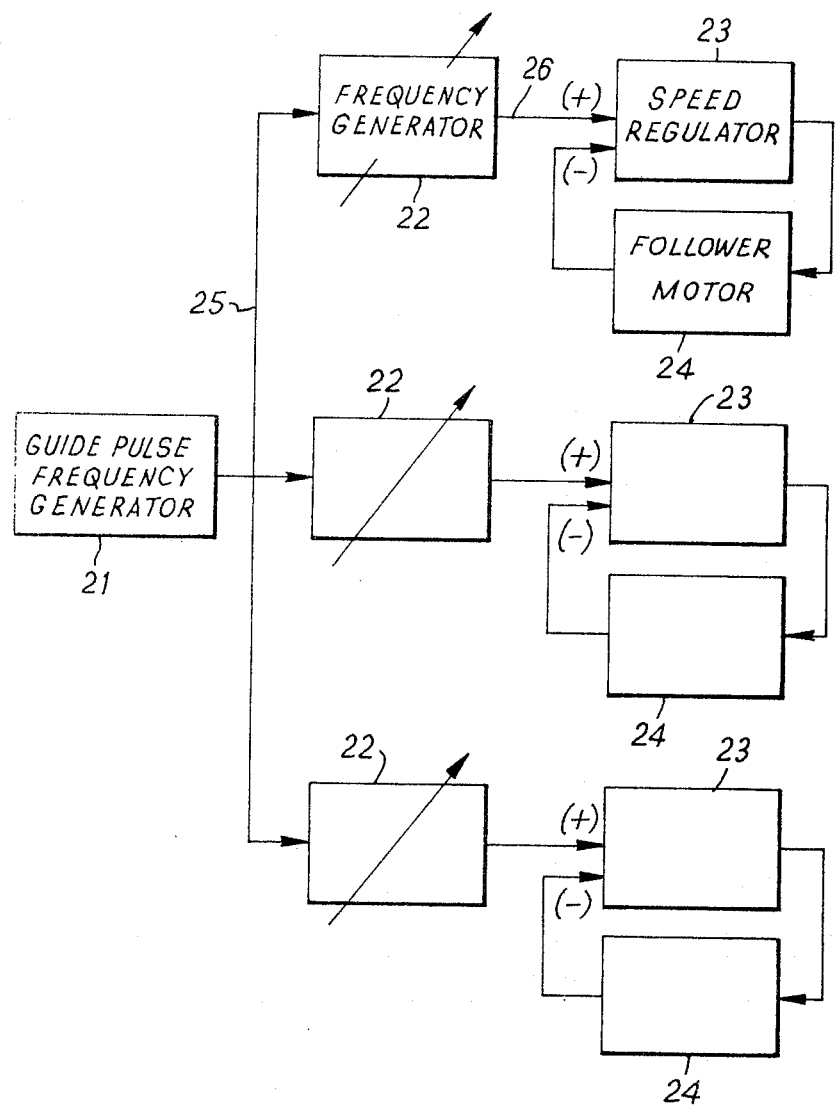
FIG. 1 is a block diagram of an arrangement according to the invention.

The arrangement according to FIG. 1 comprises a guide pulse frequency generator 21 followed by a plurality of adjustable frequency converters 22. The output frequency of each frequency converter 22 is fed to a respective speed regulator 23 as a desired speed value. Each speed regulator 23 controls a follower motor 24 so that its speed is equal to the output frequency of the upstream frequency converter 22. The frequency converters 22 all receive the same guide pulse frequency through the line 25 and can convert this to a different frequency at their output lines 26. (Unless otherwise stated, 'line' means a 'single line' in contrast with a 'multiple line'.). The follower motors 24 therefore turn at predetermined rotary speeds which have a certain ratio to one another that is independent of the guide pulse frequency and is determined by the setting of the defined transmission coefficient of the frequency converters 22. The guide pulse frequency generator 21 can be a guide motor with a speed counter (for example a tachometer) which transforms the speed of the guide motor to a pulse of corresponding frequency.

The frequency converters 22 are digital frequency converters which transform their input frequency upwardly as well as downwardly.

Figure 2:
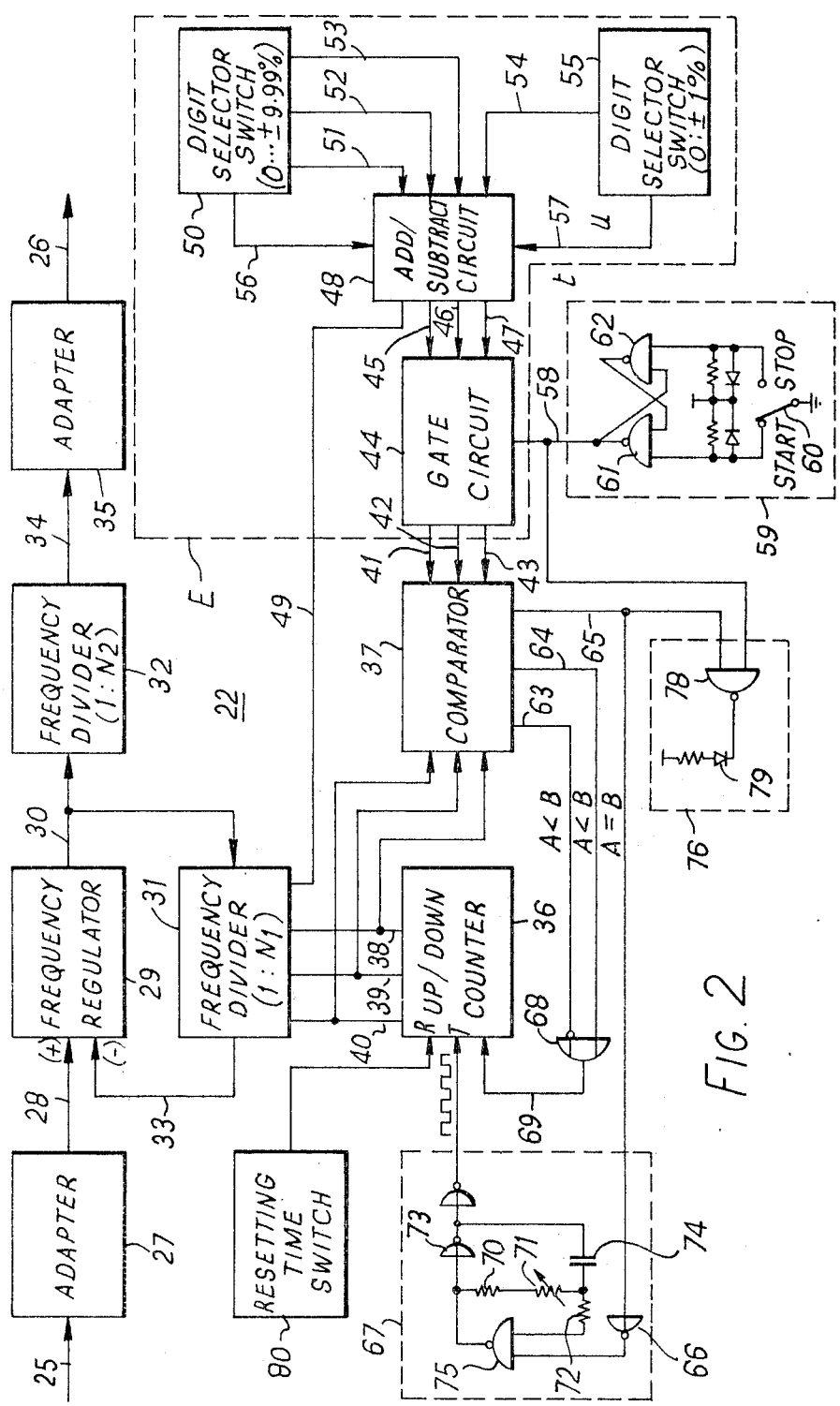
FIG. 2 is a block diagram of a frequency converter according to FIG. 1.

FIG. 2 illustrates a somewhat more detailed block diagram of a frequency converter 22. The line 25 is first connected to an adapter 27 which adapts the signal supplied through the line 25 to the design of a frequency regulator 29 that is connected downstream by way of a line 28, the line 28 leading to a first comparator input (+) of the frequency regulator 29. A line 30 leads from the output of the frequency regulator 29 to the inputs of two frequency dividers 31 and 32. A line 33 connects the output of the first frequency divider 31 to the second comparator input (−) of the frequency regulator 29. By way of a line 34, the second frequency divider 32 is followed by a further adapter 35 comprising a pulse former with a monostable multivibrator for adapting the signal fed to the speed regulator 23 by the line 26 to this speed regulator or its follower motor.

The divisors $N_1$ and $N_2$ of the frequency dividers 31 and 32 are digitally adjustable. However, it is generally sufficient to set the divisor $N_2$ to a fixed number and only adjust the divisor $N_1$ according to need. The frequency regulator 29 and the frequency divider 31 form a closed frequency regulating circuit. If the frequency fed to the frequency regulator 29 by way of the line 28 is designated $f_1$ and its output frequency at the line 30 is designated $f_a$, then the following formula applies to the differential frequency on the input side of the frequency regulator 29

$$\Delta f = f_1 - f_a \cdot (1/N_1) \tag{1}$$

Because of the property of a regulator to regulate the difference of its input quantities, i.e. the control departure, to zero, one also has the condition $$\Delta f = 0 \tag{2}$$

and thus $$f_1 = f_a \cdot (1/N_1) \tag{3}$$

or $$f_a = N_1 \cdot f_1 \tag{4}$$

Since the divisor $N_1$ of the frequency divider 31 is always larger than 1, the output frequency $f_a$ of the frequency regulator 29 is larger than its input frequency $f_1$, namely by the factor $N_1$.

The following formula then applies to the output frequency $f_2$ to the second frequency divider 32 at the line 34

$$f_2 = (1/N_2) \cdot f_a \tag{5}$$

and, by substituting equation (4)

$$f_2 = N_1/N_2 \cdot f_1. \tag{6}$$

According to equation (6), it is therefore possible by appropriately selecting $N_1$ and/or $N_2$ to set any desired whole number or fractional retio of $f_2$ to $f_1$, and in particular to make $f_2$ larger than $f_1$, even if the frequency delivered by the guide pulse frequency generator 21 (FIG. 1) has reached its upper limiting value. It is therefore possible for the speed of a follower motor 24 (FIG. 1) to be larger than that of a guide motor selected as a guide pulse frequency generator 21. If $f_2$ is chosen to be larger than $f_1$, one also obtains a higher accuracy during the adjustment and adaptation of the rotary speed of the follower motor 24 in question.

As also shown by FIG. 2, setting of the divisor $N_1$ of the frequency divider 31 is effected with the aid of a forwards-backwards counter 36. Its counted value A is fed as a servo-quantity to the three highest stages of the frequency divider 31 and to the one input side of a comparator 37 by way of three quadruple lines 38, 39 and 40 as the one comparison quantity. The other input side of the comparator 37 is supplied with a manually adjustable quantity as the second comparison quantity from a gate circuit 44 at the output side of adjusting means E, likewise by way of three quadruple lines 41, 42 and 43. The gate circuit 44 receives the quantity B by way of three quadruple lines 45, 46 and 47 from an adding-subtracting circuit 48. By way of a further quadruple line 49, the lowest stage of the frequency divider 31 is fed with a quantity associated with the lowest divisor $N_1$ directly from the lowest output stage of the adding-subtracting circuit 48.

A number manually set by means of a digit selector switch 50 and in the range of zero to ±999, i.e. in the range of 0 to ±9.99% referred to a fixed set input augend of the circuit 48, is fed to the adding-subtracting circuit 48 by way of three quadruple lines 51, 52, 53 in a binary decimal coding. The number zero or ±100 or ±1% (referred to 10,000) is fed to the adding-subtracting circuit 48 by way of the single line 54 with the aid of a likewise manually adjustable digit selector switch 55. The signs of these two numbers are determined by signals which are likewise adjustable by means of the digit selector switches 50 or 55 and fed to the adding-subtracting circuit 48 by way of a single line 56 or a duplex line 57. Thesesign signals determine whether the numbers set at the digit selector switches 50 and 55 or percentages of the fundamental number, in this case the number 10,000, are added to or subtracted from this fundamental number, the result of the addition or subtraction appearing at the quadruple lines 45 to 47 and 49 and determining the setting of the frequency divider 31, i.e. the divisor $N_1$. Accordingly, the divisor $N_1$ lies in the range of $$10,000 \pm (0 \ldots 9.99\%) \pm 1\%.$$

The signal fed to the gate circuit 44 by way of a line 58 from a start-stop switch 59 scans the gate circuit 44 when a change-over contact 60 in the start-stop switch 59 assumes the illustrated START position and blocks it when the change-over contact 60 is set to STOP. The change-over contact 60 controls a bistable flip-flop which suppresses switch-over contact shocks and which is formed from two NAND elements 61, 62 by the cross-over connection of the outputs and two of the inputs. A binary L signal is here associated with a positive potential and a binary 0 signal is associated with the potential zero. The positive potential is supplied by connections illustrated in T form and the zero potential by connections shown in the form of the usual earth symbol from a D.C. voltage source. Semi-circles represent connecting elements. Empty semi-circles represent AND elements. Semi-circles with input lines going through up to their arcs are OR elements. A small circle at the output or input of a connecting element or semi-circle represents a NOT element (reversing stage). Semi-circles with an unequal sign are EXCLUSIVE-OR elements, also termed ANTIVALENCE elements. A semi-circle with a hysteresis symbol represents a Schmitt trigger. In other respects the usual symbols are employed for ohmic resistors (small rectangles), condensers, diodes and transistors.

This explanation shows that the gate circuit 44 receives an L signal as a scanning signal and an 0 signal as a blocking signal from the start-stop switch 59.

In the START position of the change-over contact 60, the gate circuit 44 therefore feeds the quantity B to the comparator 37, i.e. the digits of the highest output value of the adding-subtracting circuit 48. The comparator 37 compares this with the counted value A of the counter 36 and feeds to the lines 63, 64 and 65 binary signals which indicate whether A<B, A>B or A=B. The signal A=B is an L signal and is fed to a blocking input circuit in the form of a NOT element 66 in an astable sequence pulse generator 67. The latter thereupon ceases to oscillate so that no more pulses are fed to the sequence pulse input T of the counter 36 and the counter 36 remains at the counted value A=B. The highest places of the divisor $N_1$ are thereby set at the part B of the output quantity of the adding-subtracting circuit 48 whereas the lowest place of the divisor $N_1$ was set directly to the lowest place of the output quantity of the adding-subtracting circuit 48. As long as A is not less than B or A larger than B, which is indicated by an L signal at the output of an OR element 68 with a NOT element on the input side on a line 69 leading to the counting direction change-over input (+,−) of the counter 36, the counter 36 counts the sequence pulses of the sequence pulse generator 67 forwardly but in the reverse case, when the signal on the line 69 is an 0 signal, backwardly until A=B.

The sequence pulse frequency therefore determines the speed with which a follower motor 24 reaches the newly set rotary speed. In this way one avoids an excessively rapid change in rotary speed. The sequence pulse generator 67 comprises a NAND element 75 negatively fed back by way of resistors 70 to 72 and fed back by way of a NOT element 73, a condenser 74 and the resistor 72, as well as a NOT element in the output circuit. The resistor 71 is adjustable so that the frequency of the sequence pulse can also be set to achieve the most favourable transmission speed of the associated follower motor on a new setting of its desired rotary speed.

A switching circuit 76 which is connected to the output of the start-stop switch 59 on the one hand and the line 65 on the other hand and which comprises a NAND element 78 on the input side and a luminous diode 79 in the output circuit responds by switching on of the luminous diode 79 when, after scanning the gate circuit 44 or after the switch 59 has been switched on to START, the highest places of the divisor $N_1$ have reached the newly set value, i.e. when A=B. The operator can thereby see that the follower motor runs substantially at the newly set rotary speed.

When changing the switch 59 over to STOP, B becomes zero so that A will finally also become zero. However, the value of the lowest place of the divisor $N_1$ predetermined by way of the line 49 remains set. In this way one ensures that the divisor cannot be set to less than 1 and the regulating circuit formed by the frequency regulator 29 and the frequency divider 31 is not interrupted so that no random output frequency can occur. Nevertheless, such a low desired rotary speed predetermined solely by the lowest digit of the divisor $N_1$, the desired speed being still further reduced by the second frequency divider 32, in most cases suffices for stopping the follower motor, particularly if it is a reluctance or synchronous motor.

With the aid of the digit selector switch 55 it is also possible to increase or reduce the set speed momentarily by 1% in order also accurately to synchronise the rotary position of a follower motor with that of a guide motor. Even if both motors have the same speed, it is not certain that they will always have the same rotary position. Instead, one can follow the other at the same speed, or vice versa. The momentary increase or reduction in the speed of the follower motor is therefore a simple way of achieving complete synchronism of both motors.

A resetting time switch 80 immediately supplies the resetting input R of the forwards-backwards counter 36 with a resetting signal upon switching on of the operating voltage of the entire arrangement. This signal first resets the counter 36 and only after a delay period within which the operating voltage can set itself to the desired value in all parts of the arrangement will it disappear and release the operation of the counter to avoid wrong settings.

Figure 3:
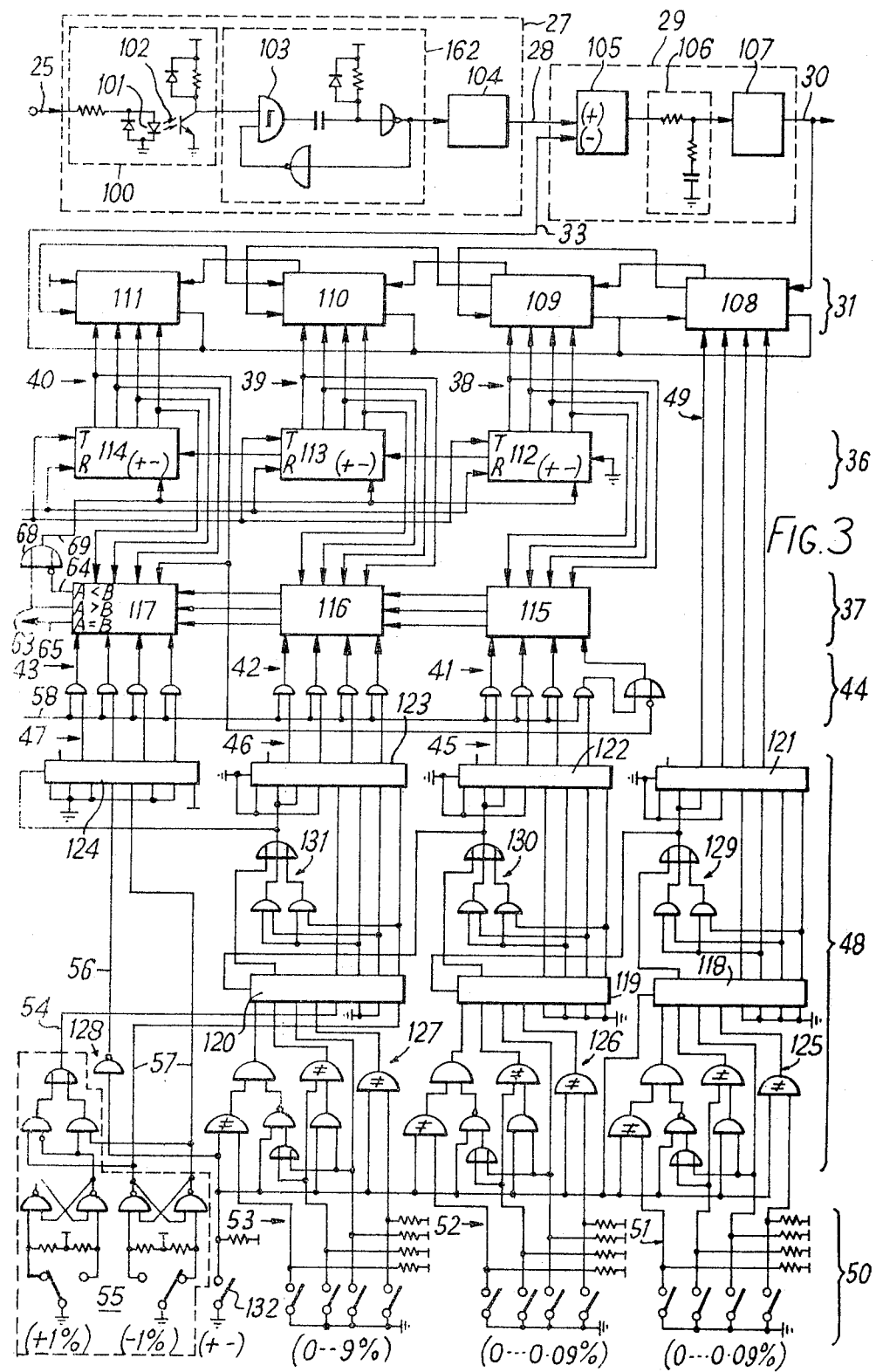
FIG. 3 is a more detailed block diagram of part of the frequency converter according to FIG. 1.

FIG. 3 shows the construction of the blocks 27, 29, 31, 36, 37, 34, 48, 50 and 55 of FIG. 2 in somewhat more detail.

The adapter 27 contains an optical coupling circuit 100 with a luminous diode 101 in the input circuit of which the light strikes a light-sensitive switching transistor 102 and brings same to the conductive condition. This results in a simple potential-free coupling of the guide pulse generator 21 (FIG. 1) to the frequency converter 22.

The output signal of the coupling circuit 100 is fed to a pulse former 162 which effects any required increase in the slope of the flanks and fixes the pulse width of the input pulses. For this purpose the pulse former 162 comprises a Schmitt trigger in the form of an AND element 103 with flip-flop behavior that triggers in the one or other direction only upon exceeding or falling below a threshold value on the input side. The AND element is fed back by way of an RC element with inverse behavior and two series-connected NOT elements so that the pulse former 162 firmly forms a monostable multivibrator. The latter is followed by a frequency divider 104 which is set to a fixed predetermined divisor, is of multi-stage, i.e. consists of two series connected forwards counters, and the divisor setting of which can likewise be selectable. This frequency divider 104 has the purpose of converting the value of the input frequency to one suitable for the frequency regulating circuit 29, 30, 31, 33. The divisor ratio can thus be 1:10 or 1:100.

Frequency regulator 29 comprises a phase comparator, an RC smoothing filter 106 behind same and then a voltage-controlled rectangular oscillator 107.

The frequency divider 31 consists of four divider stages 108 to 111 connected in cascade, of which the stages 108 to 110 is associated with the lowest decimal places of the divisor $N_1$ in this order and the last stage 111 is associated with the highest decimal places of the divisor $N_1$. The output signals of all dividing stages 108 to 111 are all fed to the line 33.

The setting of the dividing stages 108 to 111 is effected by a binary tetrade which is fed to them by respective quadruple lines 49, 38, 39 and 40 and in the case of the three lowest dividing stages 108 to 110 respectively represent a decimal number of one place and in the case of the highest dividing stage 111 a decimal number of 1 or 2 places.

The forwards-backwards counter 36 likewise consists of three series-connected counting stages 112 to 114 of which the outputs are connected by way of quadruple lines 38 to 40 on the one hand to the inputs of the dividing stages 109 to 111 and on the other hand to the one input side of comparator stages 115 to 117. The other input side of the comparator stages 115 to 117 is occupied by the outputs of the gate circuit 44 having four gates in the form of AND elements for each comparator stage 115 or 117.

The adding-subtracting circuit 48 consists of seven adding stages 118 to 124 for each two binary coded decimal numbers and an amount carried forward as well as connecting circuits 125 to 131 which are in front of the adding stages and which on the one hand ensure the transmission from one stage to the other of the required amounts carried forward and on the other hand ensure conversion of the input numbers to complementary numbers in the case of a subtraction and take into account the fixed setting of the augend 10,000. Each adding stage has four inputs on the right for a decimal digit of the one augent x and four inputs on the left for the decimal digit of the same decimal place of the other augend y. The value of the binary place associated with the inputs increases from left to right in the case of the four right-hand inputs and from right to left in the case of the four left-hand inputs. Each adding stage also has on the left-hand narrow side an input for the amount carried forward. On the output side there are four binary outputs on the right and an output for the amount carried forward at each adding stage on the left, the outputs of stages 121 to 124 for the amount carried forward being unoccupied. The series connected adding stages are both associated with the same decimal place, the value of the decimal place associated with the adding stages increasing from the right to the left whereas the value of the binary place associated with their outputs reduce from the right to the left. The adding stage 124 is associated with two decimal places, namely the two highest decimal places.

For each decimal place, the digit selector switch 50 contains four operating contacts each associated with one binary place increasing from the right to the left and one sign selector element 132 in the form of an operating contact. The operating contacts associated with each decimal place can be set to the desired decimal number in the normal binary code by means of decimal digit wheels (not shown). With the operating contacts closed, 0 signals appear at the quadruple lines 51 to 53 and L signals with the operating contacts open.

The digit selector switch 55 contains two change-over contact for the amount and sign of the additional low speed or frequency changes of ±1% (referred to the augend 10,000), the change-over contacts being followed in each case by a bistable flip-flop each comprising two cross-wise fed back NAND elements for suppressing contact shocks, the flip-flop being followed by a connecting circuit which ensures discharge of a suitable sign signal on the line 54 depending on the setting of the change-over contacts.

In the illustrated rest position of the change-over contact of the selector switch 55 and with the operating contacts of the selector switch 50 closed, a speed departure of 0% from the fundamental setting predetermined by the fixed augend 10,000 is set, so that the output signals of the adding stages 121 to 123 respectively represent the decimal number zero and the output singals of the adding stage 124 represents the decimal number 10. The devisor $N_1$ is therefore equal to the fundamental number 10,000. This number corresponds to a fixed set augend at the input of the adding-subtracting circuit to which the percentage alterations set at the selector switches 50 and 55 are referred. By means of equation (4), the output frequency $f_a$ of the frequency regulator 29 is then 10,000 times its input frequency $f_1$.

By way of example, a different settings of the selector switches 50 and 55 will now be considered. Thus, the selector switch 50 is set to ±9.00% and the selector switch 55 to −1%, i.e. all the operating contacts are closed, including the sign selector contact 132, excluding the two central operating contacts of the left-hand group of four of the selector switch 50, and the right-hand change-over contact (−1%) of the selector switch 55 is switched over whilst the left-hand change-over contact (+1%) assumes the illustrated position. This gives the decimal divisor $$N_1 = 10,000 + 90\% - 1\% = 10,000 + 900 - 100 = 10,800,$$

which means that the output signals of the adding stages 121 and 122 associated with the two lowest decimal places each represent the decimal digit zero, the output signals of the adding stage 123 associated with the third decimal place represent the decimal digit 8, whilst the output signals of the adding stage 124 associated with the two highest decimal places represent the decimal number 10.

In contrast, the setting of +9.00% and +1% give the divisor $$N_1 = 10,000 + 9.00\% + 1\% = 11,000,$$

so that the output signals of the adding stage 124 represent the decimal number 11 and those of stages 121 to 123 represent the decimal number zero. The setting of −9.99%+1% gives the divisor $N_1 = 9101$, which means that the decimal number 9 is at the output of the stage 124, the decimal number 1 at the output of stages 123 and 121 and the decimal number zero at the output of stage 122.

The setting range of this frequency converter therefore lies at $f_2 = K \cdot f_g \pm 9.99\% \pm 1$ wherein $f_g$ is the guide pulse frequency and K is obtained from the fundamental number 10,000 divided by the product of the divisors of frequency dividers 104 and 32. The accuracy of the setting therefore lies at 1/100%. It is also possible to have an adjustable alteration factor instead of the fixed alteration factor of ±1%.

What is claimes is:

1. A speed regulator for a guide and follower motor assembly, comprising, a guide pulse frequency generator driveable by a guide motor, frequency converter means responsive to said generator for driving a follower motor, said converter means including a frequency regular with negative feed back means which include a frequency divider, adjusting means for said divider and setting means for said adjusting means, said adjusting means including an up/down counter for operating said frequency divider, resetting means for said counter to provide a frequency indicating value for the output of said counter, an adjustable pulse generator for driving said counter, said setting means including add/subtract means, a comparator for comparing the outputs of said add/subtract means and said counter to control said pulse generator, said comparator having parity output means for controlling on/off operation of said pulse generator and up/down output means for controlling the up/down operation of said counter.

2. A speed regulator according to claim 3 wherein said setting means includes selector switch means to provide positive or negative coded input for said add-/subtract means, said add/subtract means having a predetermined weighted value to which said coded input is added or subtracted to provide a desired setting input.

3. A speed regulator according to claim 4 wherein the relative values of said predetermined weight value and the maximum absolute value of said coded input is on the order of 1000.

4. A speed regulator according to claim 5 wherein said settig means includes second selector switch means to provide positive or negative coded input for said add/subtract means, said second selector switch means having a maximum absolute value on the order of one-tenth that of said first named selector switch means.

5. A speed regulator according to claim 1 including a second frequency divider downstream and in series with said frequency regulator.

* * * * *